No. 873,985.
PATENTED DEC. 17, 1907.
A. C. BRANTINGHAM.
GRAIN CLEANER.
APPLICATION FILED MAY 2, 1907.
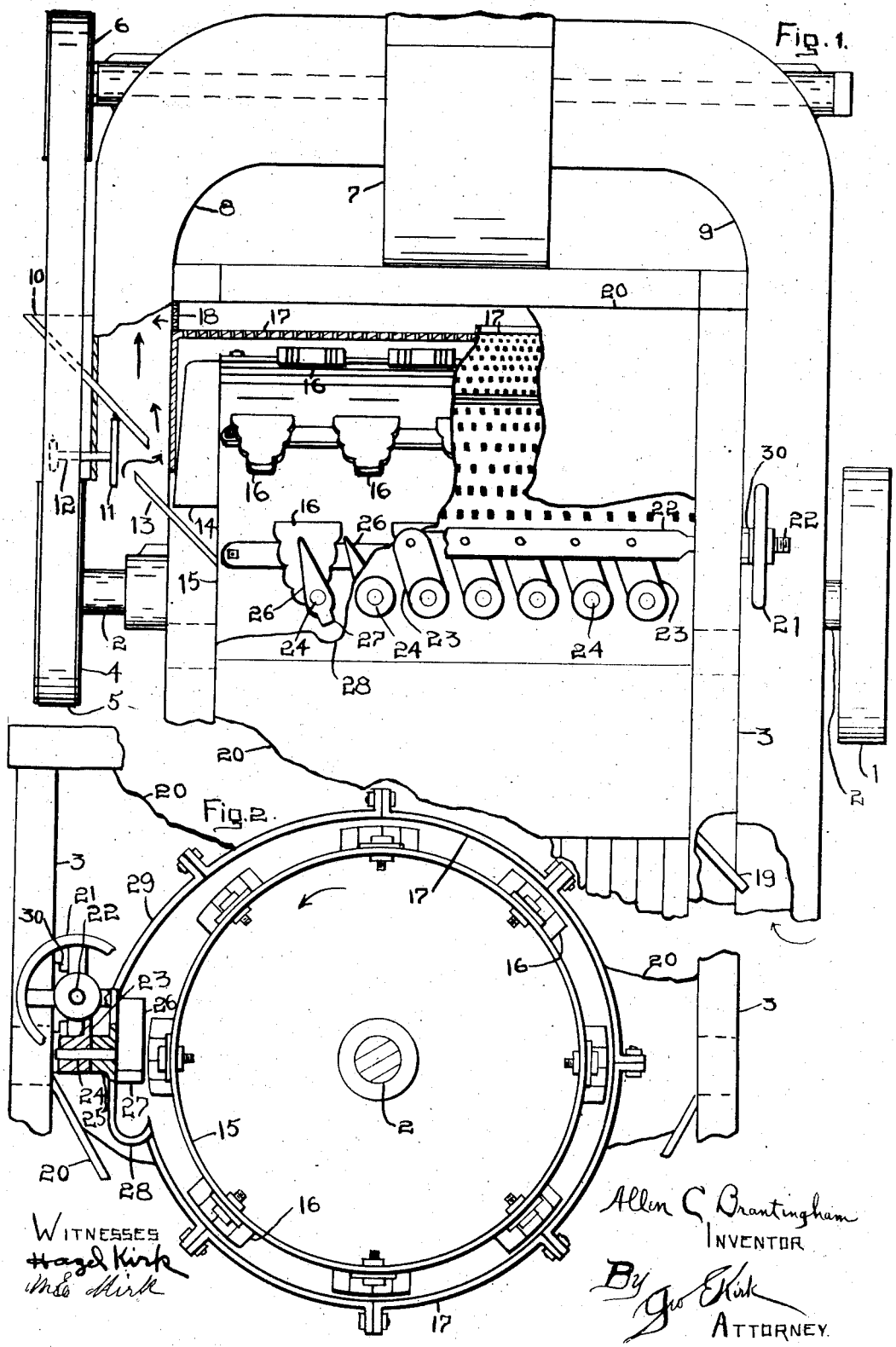

UNITED STATES PATENT OFFICE.

ALLEN C. BRANTINGHAM, OF TOLEDO, OHIO.

GRAIN-CLEANER.

No. 873,985.  Specification of Letters Patent.  Patented Dec. 17, 1907.

Application filed May 2, 1907. Serial No. 371,557.

*To all whom it may concern:*

Be it known that I, ALLEN C. BRANTINGHAM, a citizen of the United States, residing at Toledo, in the county of Lucas and State of Ohio, have invented a new and useful Grain-Cleaner, of which the following is a specification.

This invention relates to the control of the travel of a substance through a machine.

This invention has utility when embodied in a cleaner or scourer for grain, in increasing its effectiveness as a cleaner or beater, as well as providing an efficient adjustment for varying the flow of the substance treated through the machine.

Referring to the drawings: Figure 1 is an elevation, with parts broken away, showing an embodiment of the invention in a grain cleaner, and Fig. 2 is a fragmentary end view thereof with the drive wheel and some of the end of the machine removed.

The drive wheel 1 may be driven from any source of power. This wheel is rigidly mounted on shaft 2 which extends through the machine having the uprights 3. Also fixed to shaft 2 is wheel 4, which through belt 5 and pulley 6 serves to actuate the fan 7. This fan 7 has an air shaft 8 extending to the intake end of the cleaner and a second air shaft 9 extending to the outlet or discharge end of the cleaner. Suction is created in these shafts by the fan as shown by the arrows and thus removes the lighter and finer matter from the grain being treated or cleaned.

The grain is delivered to chute 10 which extends into air shaft 8, where, by the valve 11 controlled by reciprocable stem 12, the flow of air through the stream of grain may be regulated as the grain falls upon chute 13, where vanes 14 on the drum 15 throw the grain outwardly. The chute 13 delivers the substance close to the axis of the rotor or drum 15. Arranged on the drum 15 with narrowed portions extending forwardly, are a plurality of deflectors 16, which in operation cause the substance treated to continually work around, while the high speed of rotation is throwing the substance against the outer member or shell 17. This stator or shell is perforated and the surrounding chamber is in communication at wall 18 with the air shaft 8, so that the cleaning suction action of the air is effective throughout the length of the stator 17. As the grain has traveled axially of the rotor 15 through the cleaner, it is discharged by chute 19. To provide the chamber around the stator 17 is the wall 20.

Carried by the machine near one end thereof is a hand wheel 21 having threaded engagement with shaft 22 which extends parallel to the rotor 15. Shaft 22 engages a plurality of arms 23 fixed to separate rods or pins 24 carried in bearings 25. These pins extend into the space between the rotor 15 and stator 17, and in this space each pin carries a deflector or flight 26, the narrowed portion of which is opposed to the narrowed portion of the deflectors 16 carried by the inner member 15. These deflectors 26 on the outer member 17, have extensions 27 at their rearward ends remote from the narrowed portions and beyond the pins 24. Extending longitudinally of the stator 17 and adjacent the extensions 27 is the trough 28. Near the narrowed portions of the flights 26, the stator 17 has a portion of its wall 29 recede from the rotor 15. These portions 28 and 29 of the stator 17 form an enlargement which produces a chamber in communication with the passage between the outer and inner members 15, 17, through which the grain treated may pass.

Operation: By driving wheel 1 and admitting grain at chute 10, the deflector carrying drum 15 is rotated and the fan 7 creates a suction in the air shafts. Were the deflectors 26 perpendicular to the axis of drum 15, there would be no tendency to aid the deflectors 16 in creating a flow of the grain through the cleaner. However by rotating wheel 21, which is axially held by box 30 from longitudinal movement, the rod 22 is reciprocated, and thereby through arms 23 and pins 24 the deflectors 26 may be uniformly shifted to a slanting position as shown in Fig. 1, so that they serve as flights to aid in conveying the grain toward the discharge end of the machine. As the degree of slant may be conveniently adjusted, an efficient means is provided for governing or controlling the velocity of flow of the substance treated through the machine. This is a desirable feature as the varying condition of separate lots of grain require different treatment. This device not only comprises a minimum number of parts, but is not subjected to clogging up and does not break up the grains of wheat or other substance being cleaned. Furthermore the effectiveness of the machine as a cleaner is much enhanced, for by the centrifugal action the grain is thrown not only against deflectors 26 but lodges in a bed of grain in the trough 28, where the grain in its circumferential travel is abruptly stopped, rubbed against itself and its direction of movement changed to overflow in to the passage between members 15 and 17 below trough or channel 28, where it is again acted upon by the drum 15 and deflectors 16 to be brought around to the chamber containing the deflector flights 26, which action is repeated until the grain reaches the end of the drum 15 and is discharged through chute 19. The arrow in Fig. 2 indicates the direction of rotation of the drum 15. The deflectors 16 are grain impelling stirrers, while deflectors 26 are retarding as to the circumferential movement of the grain and accelerators as to the axial or longitudinal movement. The trough 28 which also deflects the grain is a retarder to circumferential movement of the grain.

The idea of the invention herein disclosed is not to be limited by the drawings and description to any greater extent than the ordinary meaning of the terms of the claims demand. In other words, the elements set forth in the claims are to be interpreted broadly, giving me the advantage of equivalents in the protection of my idea.

What is claimed and it is desired to secure by Letters Patent is:

1. A cleaner comprising relatively movable outer and inner members, between which may be introduced the substance to be scoured, and one of which is provided with a normally overflowing axially extending trough wherein the substance through its own action receives effectual scouring.

2. A cleaner comprising outer and inner members, one of which is rotatable, and between which the substance to be scoured is caused to flow, said outer member having a trough, and deflector means against which the substance acts before entering the trough to control its velocity of flow through the cleaner.

3. A cleaner comprising a revolving drum, forwardly pointing wedge shaped deflectors thereon, a casing for the drum having an overflow trough and adjustable deflector means to advance the travel of the substance being cleaned as it is thrown toward the trough.

In testimony whereof I affix my signature in the presence of two witnesses.

ALLEN C. BRANTINGHAM.

Witnesses:
   GEO. E. KIRK,
   JENNIE C. NASH.